Quackenbush & Hawn,

Bread Pan.

No. 4230. Reissued Jan. 10. 1871.

Witnesses;

N. A. Lewis,

H. Ellyes

Inventors;

Abram I. Quackenbush

Guilford Hawn

By

I. C. L. Hamilton

N. PETERS, PHOTO-LITHOGRAPHER, WASHINGTON, D. C.

UNITED STATES PATENT OFFICE.

ABRAM I. QUACKENBUSH AND GUILFORD HAWN, OF FORT PLAIN, N. Y.

IMPROVEMENT IN DEVICES FOR BAKING BREAD.

Specification forming part of Letters Patent No. 99,109, dated January 25, 1870; Reissue No. 4,230, dated January 10, 1871.

*To all whom it may concern:*

Be it known that we, ABRAM I. QUACKENBUSH and GUILFORD HAWN, of Fort Plain, in the county of Montgomery and State of New York, have invented a new and useful Device to be used in Baking Bread; and we do hereby declare that the following is a full, clear, and exact description thereof, reference being had to the accompanying drawing, making a part of this specification, in which—

Figure 1:
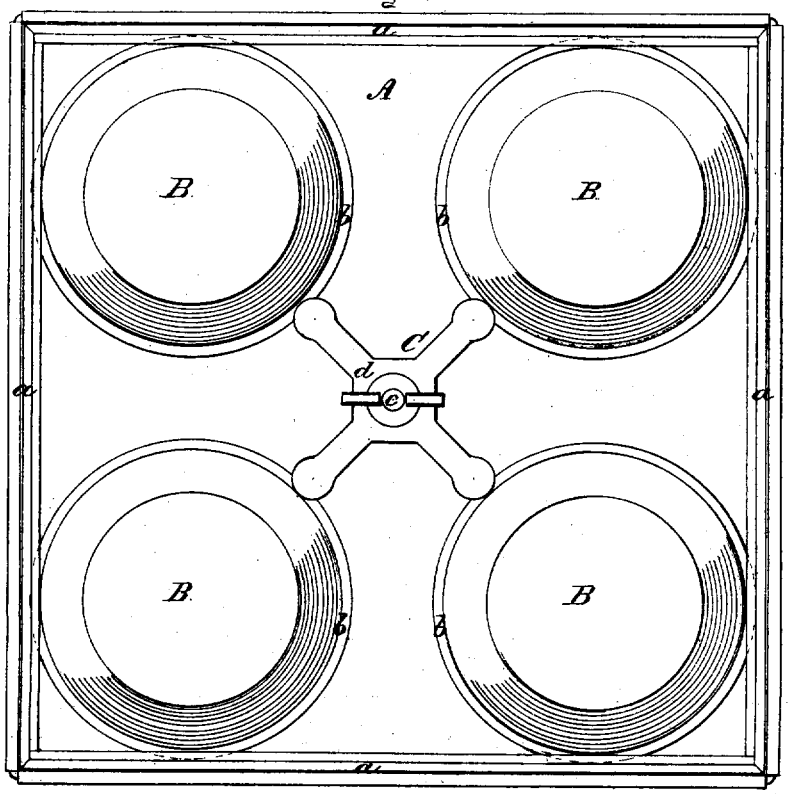
Figure 2:
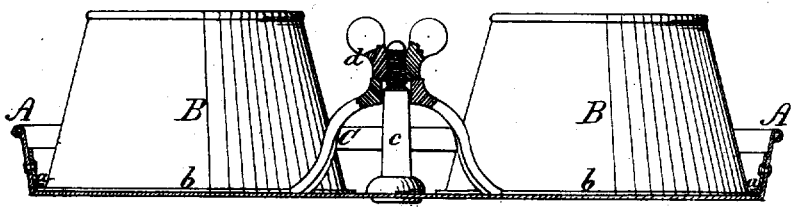

Figure 1 is a top view of the device adapted for four loaves. Fig. 2 is a vertical transverse section through the center of Fig. 1.

Similar letters of reference indicate corresponding parts in the two figures.

During the operation of baking bread under the method heretofore adopted the entire surface of the loaf is exposed to the heat of the oven, which allows the liquids with which the dough is mixed to evaporate and pass off through the flues of the oven into the chimney in the form of steam. Thus a large portion of the essence and nutritious qualities of the flour is lost, which leaves the bread baked in this manner dry and husky.

To remedy this objection the nature of our invention consists in an apparatus for receiving the dough, and so confining it during the operation of baking that the vapors are, in a great measure, prevented from escaping, and many good results thereby obtained, as will be hereinafter explained.

To enable others skilled in the art to understand our invention, we will describe its construction and operation.

In the accompanying drawing, A represents a flanged pan, which may be made of a rectangular or other form and of any required size. From the edges or sides of this pan flanges rise, to the inner sides of which lips *a a* are secured, so as to leave narrow spaces between them and the bottom of the pan. The lips *a* may be continuous or not, as circumstances require. From the center of the pan A a post, *c*, rises perpendicularly, which is permanently fixed to the pan, as shown in Fig. 2. The upper end of post *c* has a male screw-thread cut on it for receiving a thumb-nut, *d*.

C is a spider-clamp having four legs, the feet of which are flattened, as shown in the drawing. Through the body of this spider C a hole is made vertically for receiving loosely the upper end of the post C, as shown in the drawing.

B B B B are four cups, of any required size and shape, which are constructed with flanges around their open ends, or the ends which lie upon the bottom of the pan A.

The dough is put into the cups B, and the latter inverted upon the pan A and adjusted so that their flanges are received beneath the lips *a*. The spider C is then adjusted on post *c*, so that the feet of the spider rest upon the flanges *b b b b* of the cups B B B B, after which the nut *d* is screwed down tightly, thus confining the cups in their places. The pan with its cups are then introduced into an oven and the dough in the cups thus baked.

We have represented means for baking four loaves of bread at one time; but it is obvious that these means may be modified for baking a less number or increased to a greater number of loaves.

It will be seen from the above description that we provide for confining the gases and vapors within and about the dough during the operation of baking it. At the same time we form a mold for the loaf, so that in baking a number of loaves they will be of the same size and shape.

The following are other advantages growing out of our improved mode of baking bread: The nutritious qualities of the flour are retained; uniformity in results; moistness, and comparative freedom from mold; the bread is comparatively steam-baked, and a uniform thickness and color of crust are obtained.

Having described our invention, what we claim as new, and desire to secure by Letters Patent, is—

1. The combination of the clamp, or its equivalent, with a cup, B, and pan A, substantially as described.

2. The construction of the pan A with lips *a*, adapted to receive flanges *b* on cups B, substantially as described.

3. The combination of the clamp C, or its equivalent, with the cup B, or its equivalent, and pan A, substantially as and for the purposes described and set forth.

ABRAM I. QUACKENBUSH.
GUILFORD HAWN.

Witnesses:
J. E. L. HAMILTON,
R. H. SHEARER.